United States Patent [19]
Freeman et al.

[11] Patent Number: 6,075,553
[45] Date of Patent: Jun. 13, 2000

[54] AUDIOVISUAL TELECOMMUNICATION METHOD AND APPARATUS USING A DIGITAL NETWORK

[75] Inventors: Karen Martita Freeman, Washington, D.C.; Herman Joseph Pieters, Miami, Fla.; Jack Andrew Pitman, II, Germantown, Md.

[73] Assignees: Lucent Technologies Inc., Murray Hill, N.J.; AT&T Corp.

[ * ] Notice: This patent is subject to a terminal disclaimer.

[21] Appl. No.: 08/871,835

[22] Filed: Jun. 9, 1997

Related U.S. Application Data

[63] Continuation of application No. 08/448,239, May 23, 1995, Pat. No. 5,841,469.
[51] Int. Cl.[7] .................................................. H04M 11/00
[52] U.S. Cl. .................... 348/15; 379/144; 379/91.01; 379/93.21; 379/114; 379/93.22; 379/93.19; 348/14
[58] Field of Search ................................ 348/14, 15, 16, 348/20; 379/93.17, 93.19, 93.21, 93.22, 93.23, 93.25, 91.01, 144, 114, 111

[56] References Cited

U.S. PATENT DOCUMENTS

| | | | |
|---|---|---|---|
| 4,688,105 | 8/1987 | Bloch et al. | 386/38 |
| 5,598,351 | 1/1997 | Chater et al. | 348/15 |
| 5,604,341 | 2/1997 | Grossi et al. | 348/15 |
| 5,841,469 | 11/1998 | Freeman et al. | 348/15 |

FOREIGN PATENT DOCUMENTS

| | | | |
|---|---|---|---|
| 0574138 | 12/1993 | European Pat. Off. | H04N 7/15 |

*Primary Examiner*—Stella Woo
*Attorney, Agent, or Firm*—Martin I. Finston

[57] ABSTRACT

A videoconferencing network of audiovisual communication terminals is interconnected by a telephone network. Each terminal is activated only when the balance in a user account has been read and the account has been made available for debiting. The terminal includes a monitor system for playing out and receiving voice and picture information, an interface system for conditioning signals passing between the monitor system and the telephone network, and a database which contains the locations and telephone numbers of other terminals of the videoconferencing network. The terminal firer includes a display of information from the database, a pointing device by means of which a user can make a selection from the display by indicating the relevant position in the display, and a device for automatically dialing up the selected remote terminal.

21 Claims, 3 Drawing Sheets

AUDIOVISUAL TELECOMMUNICATION METHOD AND APPARATUS USING A DIGITAL NETWORK

This is a continuation of application Ser. No. 08/448,239 filed May 23, 1995, now U.S. Pat. No. 5,841,469.

FIELD OF THE INVENTION

This invention relates to teleconferencing terminals and networks thereof. More specifically, the invention relates to audiovisual teleconferencing terminals that can be interconnected via publically accessible, digital, telephone networks.

ART BACKGROUND

The public has long enjoyed the convenience of coin-operated or card-operated public telephones. These devices have made it possible for customers to place telephone calls when business or travel takes them out of their homes, or when their homes are not equipped with telephone sets.

The same is not true of videoconferencing terminals. Although there is a substantial demand for videoconferencing services, terminal equipment for this purpose has been, and remains today, concentrated in narrow markets.

In the 1960s and 1970s, AT&T PICIUREPHONE visual telephone service provided audiovisual communication between publicly accessible installations. However, this service was not widely, available, and was inconvenient to use, largely because it lacked a high level of automation. In the 1970s and 1980s, AT&T provided a PICTUREPHONE meeting service. This service suffered some of the same disadvantages as the earlier PICTUREPHONE service, and was not generally available to the public.

Currently, AT&T provides a standard teleconferencing service, intended mostly to serve businesses. This service overcomes many of the disadvantages of the earlier PICTUREPHONE services, but does not result in facilities that are available to the general public, and is beyond the economic reach of most individual consumers.

The advent of desktop video systems has made it possible for private individuals to participate in teleconferencing. However, private videoconferencing products and services call for service fees and an investment in equipment that substantially exceed the costs of ordinary telephone services. Thus, even the current generation of desktop video is not attractive to the consumer who would be only a casual or incidental user of teleconferencing services.

Thus, until now there has lacked a videoconferencing facility, generally available to the public, for making a two-way, audiovisual call between generally accessible locations at a modest, one-time cost.

SUMMARY OF THE INVENTION

We have provided such a facility. In a broad sense, our invention involves a videoconferencing network of audiovisual communication terminals interconnected by a telephone network. Each terminal is activated only when the balance in a user account has been read and the account has been made available for debiting. The terminal includes a monitor system for playing out and receiving voice and picture information, and an interface system for conditioning signals passing between the monitor system and the telephone network. The terminal further includes a database which contains the locations and telephone numbers of other terminals of the videoconferencing network. The terminal further includes a display of information from the database, a pointing device by means of which a user can make a selection from the display by indicating the relevant position in the display, and a device for automatically dialing up the selected remote terminal.

DETAILED DESCRIPTION OF A PREFERRED EMBODIMENT

Figure 1:
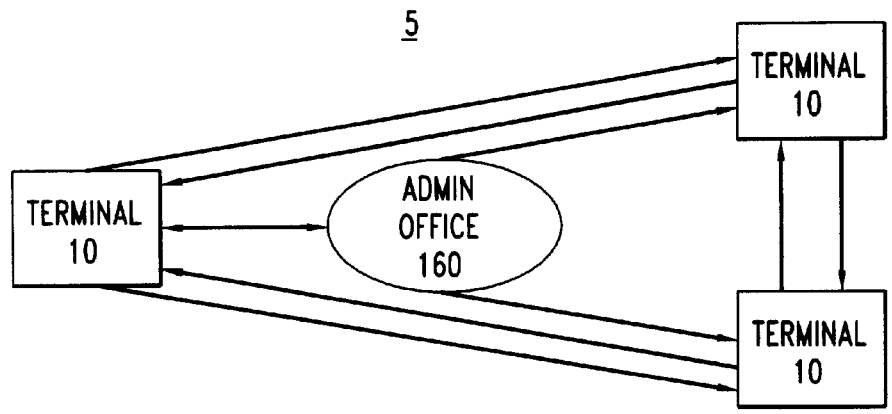

Turning to FIG. 1, the invention in one aspect is a network 5 of audiovisual teleconference terminals 10, interconnected by a public switched telephone network (PSTN) 20. In order to assure that there is sufficient capacity to carry audio and video communication signals, it is desirable for public network 20 to provide ISDN service, or the equivalent, between each terminal and its local exchange.

For convenience in charging for calls, it is advantageous for public network 20 to be configurable so as to define the network 5 of teleconference terminals (hereafter, the "T/C network") as a virtual private network (VPN) such as a software-defined digital network (SDDN).

A VPN is a carrier-provided service that emulates a network of private lines, but is designed logically within a public network. VPN services are commercially available from common carriers in the telecommunications industry. For example, AT&T provides a software-defined network intended primarily as a communication service for businesses having multiple locations and unique communication requirements. In such a service, information for processing telephone calls is stored in a database, and this database is accessed during each call. Brief descriptions of this technology may be found in Newton's Telecom Dictionary, Flatiron Publishing, Inc. (1994), pp. 957–958 and 1123–1124. A particular implementation of VPN technology is described in U.S. Pat. No. 4,348,554, issued to R. Asmuth on Sep. 7, 1982.

The virtual private network arrangement makes it possible for the billing for use of the PSTN to be directed to a central service provider. This provider can arrange to be paid back by, for example, selling debit cards to its customers. These cards can, in turn, be used to activate the terminals 10 at the expense of charge accounts stored on the cards.

Figure 2:
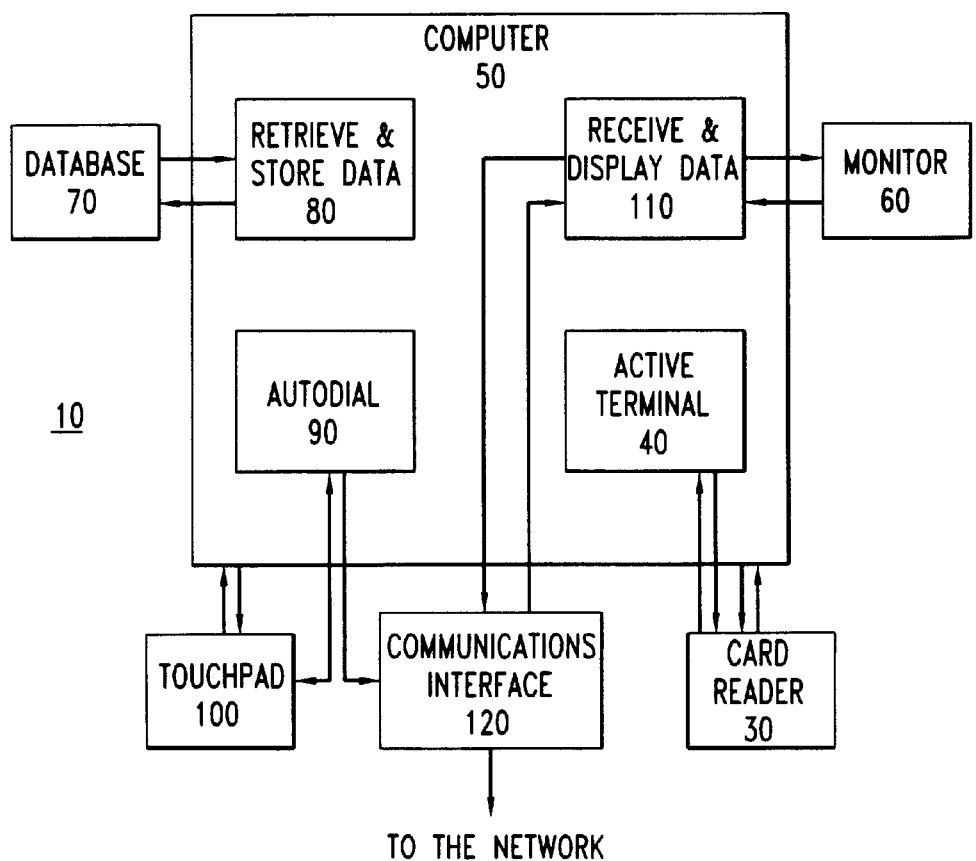

Such a card-activated system is depicted in FIG. 2. As shown in that figure, card reader 30 operates element 40 for activating the terminal so that it will communicate with and respond to a user. In our currently preferred embodiment, the activation function of element 40 is implemented in software which resides in computer 50.

One type of card useful in this context is a Smartcard, which incorporates a solid-state memory chip. Such a card is readily prepared, for sale to users, by storing in the memory a decrementable record of the number of monetary units remaining in a prepaid account. Advantageously, each card also stores a serial number unique to that card.

By way of example, the card remains in the card reader during the entire duration of the teleconferencing call (hereafter, simply, the "call"). Monitor 60, which includes a display screen such as a CRT screen, warns the user when the debit account is approaching exhaustion. Optionally, the screen may display a periodic or continual notice of time remaining in the account. At the end of the call, the account balance is updated and recorded in the card. The rate at which the card is debited can be made dependent upon the type of call. For example, a database included in the terminal stores the telephone numbers of terminal locations in network 5. (Optionally, this database also stores the telephone numbers of terminals that are not part of the private network, but are owned or controlled by parties who have indicated that they wish to subscribe to the database so that they can be dialed up automatically and reached via the PSTN. Such terminals are referred to herein as "off-net" terminals.) In association with each stored telephone number, a charging rate is also readily stored. Thus, for example, local, domestic long distance, and international calls can be charge the debit card at distinct rates.

We, currently envisage that only the originator of the call will be debited for the call, but as an optional feature of the invention, each party may be required to insert his card into an external card reader in order to gain access to the terminal, exemplarily by unlocking the door to a booth.

Alternative debitting schemes are readily apparent and are intended to fall within the scope of the invention.

For example, the owner of the premises where each terminal is located may charge a fee for the user of his premises. Such fees may be deducted from the cards at both ends.

As noted, computer 50 is in communication with card reader 30. Computer 50 performs the metering of calls for billing purposes, and directs card reader 30 to debit the card accordingly.

Each terminal 10 also includes a database 70 which lists the locations and telephone numbers of the other terminals of T/C network 5. This database will typically reside within computer 50, as will the functionality, represented in the figure as element 80, for retrieving data from, and storing data in, the database.

In order to simplify the use of the terminal, it is advantageous to include an autodial functionality 90, which will also typically reside within the computer.

This functionality will automatically dial up (i.e., enter the telephone number of) the destination terminal, in order to made the desired telephone connection. A simple, manual action by the user will indicate the selected terminal location that is to be dialed up.

For example, our currently preferred embodiment includes a touch-activated surface which includes a computer-driven, graphical display device. The display device is exemplarily a VGA/SGA monitor, and may be identical with the display device of monitor 60. Alternatively, a separate device having touch-activation and display functions is provided. Such a separate device is shown in the figure as touchpad 100, which exemplarily incorporates a liquid crystal display (LCD) driven by computer 50.

A succession of fields containing selections of narrowing scope are presented on the touch-activated display device, such as a choice of continents, followed by a choice of countries within the selected continent, followed in like manner by regions, cities, and point locations. Each field is displayed as an array of shapes, or icons. The user indicates his choice with the touch of a finger on the desired shape or icon.

Alternatively, the various locations are displayed in the form of maps which change in scale as the selection is narrowed down. Each successive selection is indicated by touching a map region, or an icon superimposed on a map.

Significantly, both terminal locations that are part of the private network, and "off-net" locations, can be indicated in these displays.

The first field also includes a touchable symbol for the "manual dial" option. If this option is selected, the next field to be displayed is a representation of a telephone keypad, for receiving the manually-entered telephone number.

It is desirable for each field after the first one to include a "go back" icon.

Advantageously, at least some of the fields also include an audio volume control (represented, e.g., by a bar or series of gradations) and a start call/stop call button. Initially, this icon appears as a "start" button, to be touched in order to initiate the autodial function. Once the call has been placed, the word "start" changes to "stop," and touching of this icon then terminates the call which is in progress. These functions are performed by computer 50 which, as noted, is in communication with the touchpad.

Monitor 60 includes a video camera and microphone for receiving local audiovisual information, and a screen and loudspeaker for reproducing remote audiovisual information.

Input and output signals pass to and from the monitor via the data-handling functionality designated as element 110 in the figure. This functionality is typically provided by computer 50.

The data passing between terminal 10 and telephone network 20 are mediated by communication interface 120. This communication interface conditions the incoming and outgoing signals, which carry audio information, video information, and digital data, so that these signals can be exchanged between the computer and monitor, on the one hand, and the telephone network on the other hand.

Figure 3:
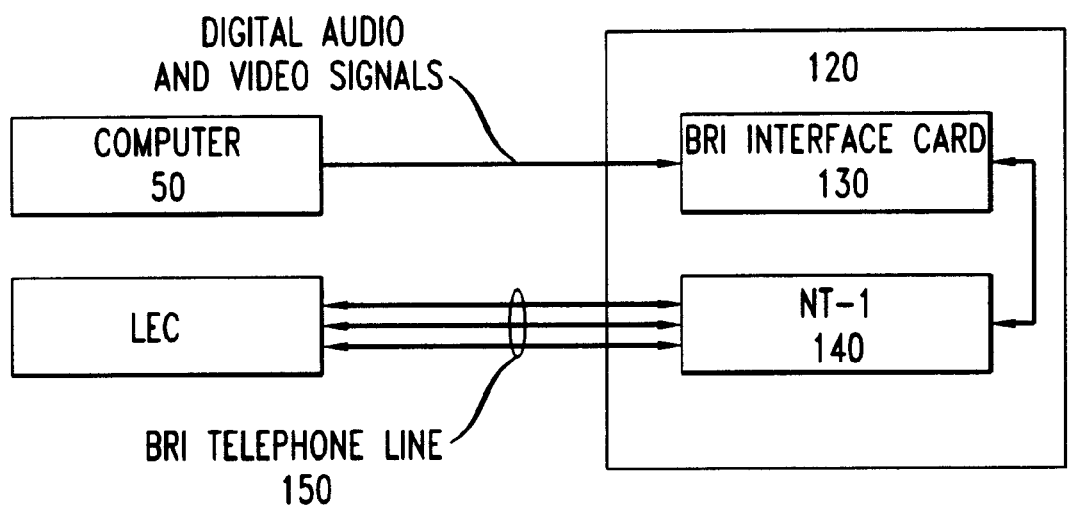

A currently preferred embodiment of interface 120, as shown in FIG. 3, includes BRI interface card 130 and NT-1 network terminal interface device 140. As noted, the local facilities network should provide ISDN service in order to transmit the full range of signals passing through interface 120. Preferably, the local facilities network includes a BRI line 150 to interface 120, because such a line has the capacity to carry 128 kbit/sec video signals. As shown, the BRI line is connected to the NT-1, which performs digital-to-digital data conversion. The NT-1, in turn, is connected to BRI interface card 130.

Turning back to FIG. 2, our current implementation of terminal 10 is built around the commercially available AT&T VISTIUM® System. The basic system includes a P-5 computer system, an audio system, a keyboard, an NT-1, a 14.4 modem, a 1300 system board, a BRI card, and other peripheral components. The touchpad 100 is similar to a touch-sensitive LCD screen that is commercially available from the Phoenix Group, Inc. Suitable cards and card readers are commercially available, exemplarily from GEM-PLUS Card International Corp., 656 Quince Orchard Rd., Suite 610, Gaithersburg, Md. 20878.

The video display portion of monitor 60 is preferably a video monitor that uses NTSC protocols. If necessary, such a monitor can be made to operate at reduced resolution so that it is controllable at the same data rate as a (lower resolution) LCD touchpad.

When the P-5 computer system is used, it is advantageous to control both the video monitor and the touchpad from a single controller card, which is modified, if necessary, to provide a compatible port for connection to the touchpad.

It is desirable for terminal 10 to be enclosed within a booth for privacy and isolation from visual and acoustic distractions. Such a both is conveniently provided in the form of, e.g., a fiberglass shell having a lighting and ventilation system. The light level is optionally controlled by way of a further icon displayed in at least some of the fields of touchpad 100.

Turning back to FIG. 1, network 5 also desirably includes administrative office 160. This office will typically include at least some of the same, or similar, components as each of the terminals 10, such as computer 50, database 70, and interface 120. Information about the status, location, and telephone number of each of the terminals 10, and optionally, also information about card serial numbers known to be fraudulent, is initially stored in the database at the administrative office.

Figure 4:
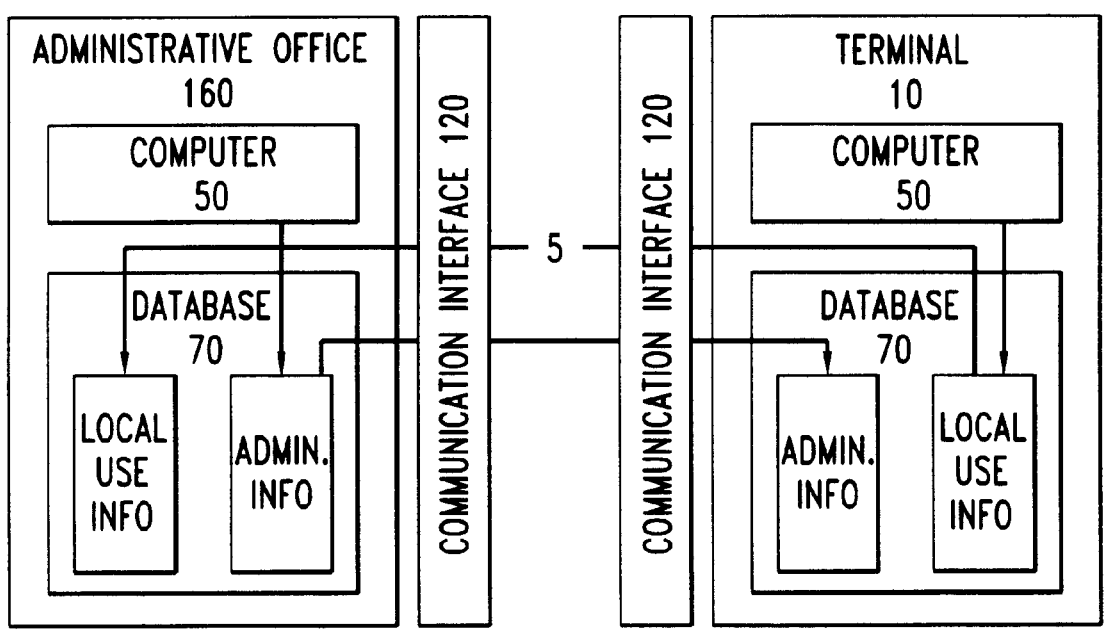
Figure 5:
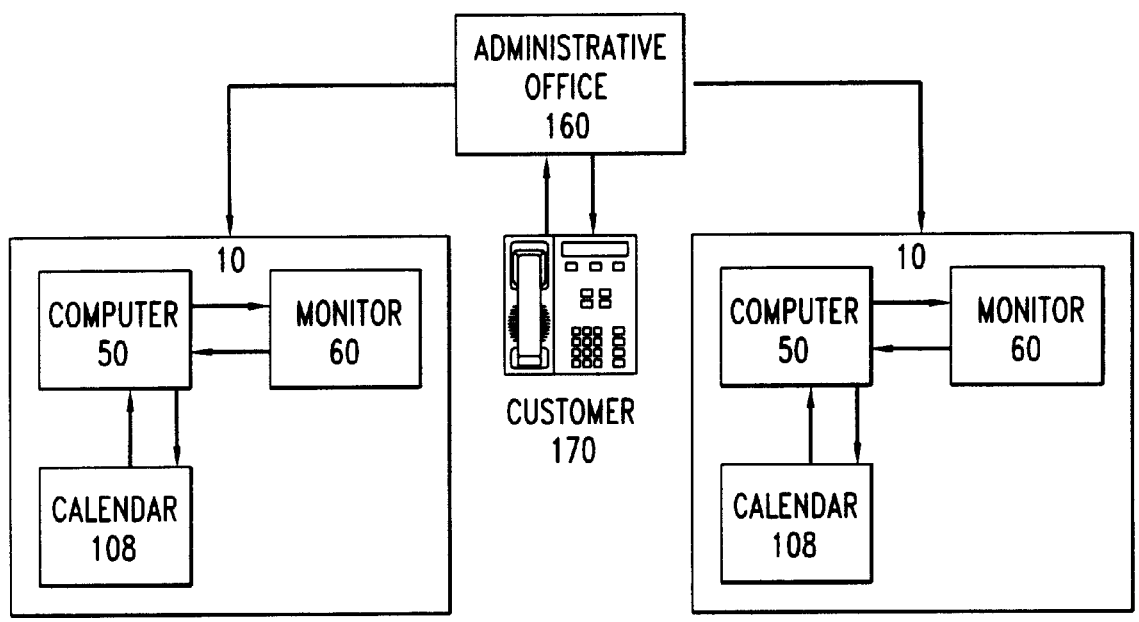

As shown in FIG. 4, this information is transmitted over network 5 to each of the terminals, together with a digital sequence that identifies it as administrative information. Upon recognition of this sequence the information is read into database 70 at each terminal.

Conversely, each terminal locally stores information about the use of that terminal. This "use" information includes the serial number of each card used to initiate a call, the duration of each call, and the destination of each call. When a request is initiated by an appropriate code sequence from the administrative office, the computer at the called terminal reads the "use" information out of its local database and sends it to the administrative office.

A further function optionally performed by the administrative office 160 is the implementation of a reservation system. To arrange for a reservation, a customer contacts the administrative office via telephone 170 or other suitable communication device. Through a human customer representative or through a computer at office 160, as appropriate, the customer specifies a timeslot and two or more terminal locations that are to be connected. Office 160 then sends these timeslots to the reserved terminals as administrative information, and optionally also sends information about premium billing for this service.

At each local terminal, this administrative information is used to set a calendar function that informs the local computer when a reserved timeslot is approaching. This is achieved, for example, by having the computer consult a locally stored record of reserved timeslots every time a user attempts to activate the terminal.

If a user does, in fact, attempt to activate a terminal within a predetermined margin, such as one hour, before the beginning of a reserved timeslot, the monitor will display a warning message that available time is limited. If the user nevertheless proceeds with a call, the monitor will display at least one further warning message before the call is terminated by the local computer.

It is advantageous for the reserving party to submit his card serial number at the time the reservation is made. This information will then be sent to the local terminals along with the other information about the reservation. This identification number can be matched against the serial number actually used to activate the terminal to make the call. The call will be authorized only if the serial numbers agree.

A similar authorization procedure can be implemented with respect to the serial number of the debit card that belongs to the party who is to receive the call. However, in many cases it may be unnecessary for the receiving party to use a card.

Optionally, the call can be automatically set up at the start of the reserved timeslot without the need for the calling party to manually select his destination. The calendar information referred to above can, e.g., trigger an instruction to load the pre-arranged receiving telephone number into the terminal's autodial facility at the beginning of the reserved timeslot.

The above discussion has mostly addressed two-party calls. However, it should be noted that multiple-party calls are as readily made using the inventive network. This is done using appropriate transmission equipment at the local terminals 10. Alternatively, multiple-party calls are made by routing calls through a commercial teleconference service having a multipoint video bridge. Such a service is the AT&T Video GO Center.

The invention claimed is:

1. A network of audiovisual communication terminals interconnected by a communication medium, wherein the communication medium comprises a virtual private network, and each terminal comprises:

a) a monitor system for playing out and receiving voice and picture information, the monitor system including a display screen, the monitor system further including a microphone and video camera for video teleconferencing;

b) a card reader adapted to activate the terminal only after reading the balance in an account on a debit card, and further adapted to reduce said balance according to a call duration and a billing rate;

c) a communication interface device that conditions, for reception, audiovisual signals from others of said terminals that pass to the monitor system via the communication medium, and that conditions, for transmission, audiovisual signals to be sent to others of said terminals via the communication medium;

d) a dial-up device adapted to make contact with at least one specified other of said terminals via said virtual private network;

e) a destination database at least of other said terminals, said database including respective billing rates for calls to said other terminals;

f) an information-retrieval device adapted, upon request, to retrieve from the destination database information about others of said terminals and, responsive to the retrieved information, to display on the screen a selectable listing of other terminals to which contact may be made;

g) a user-activated selection device adapted to automatically direct the dial-up device to make contact with a terminal selected by a user from the displayed listing; and h) a device for calculating a charge from retrieved database billing rate information and from call duration, and for communicating said charge to the card reader so that the account balance on the debit card can be reduced by said charge.

2. Apparatus of claim 1, wherein the communication medium is a public telephone network.

3. Apparatus of claim 1, wherein the user-activated selection device comprises a touch-sensitive display device.

4. Apparatus of claim 1, wherein the destination database contains information relating to the locations of other terminals of the network, and the selectable listing is displayed on the screen in the form of at least one map.

5. Apparatus of claim 4, wherein the information-retrieval device is adapted to display the listing as a large-scale map, and, responsive to the selection device, at least one map selected from a plurality of smaller-scale maps.

6. Apparatus of claim 4, wherein the network is a software-defined digital network, and the destination database further contains information relating to the locations of terminals that are not part of said network, but can be selected by the use of the user-activated selection device and accessed by the dial-up device.

7. Apparatus of claim 1, wherein the private network is a software-defined network.

8. Apparatus of claim 7, wherein the private network is a digital network.

9. Apparatus of claim 1, wherein each terminal is enclosed within a booth, the booth includes a light source and a light-level controller for regulating the light source, end the user-activated selection device is adapted to activate the light-level controller at the option of a user of the terminal.

10. Apparatus of claim 1, wherein each debit card has a serial number, and each terminal further comprises:
   a library of invalid serial numbers; and
   means for comparing the serial number of each user's card with said library, thereby to verify that said card is valid before the terminal is activated.

11. Apparatus of claim 1, wherein the destination database contains information relating to the locations of other terminals on the network, and the selectable listing is displayed on the screen in the form of a plurality of icons.

12. Apparatus of claim 1, wherein the network is a software-defined digital network, and the destination database contains information relating to terminals that are not part of said network, but can be accessed by the dial-up device.

13. Apparatus of claim 1, further comprising an administrative office interconnected with each of said terminals, an administrative database included within the administrative office, and means for sending data from the administrative office to each said terminal and storing said data at each said terminal.

14. Apparatus of claim 13, wherein said administrative database comprises a library of destinations that are intended to be accessible by the dial-up device at each terminal, and the storing means are adapted to store information about said destinations in the destination database at each said terminal.

15. Apparatus of claim 13, wherein:
   each debit card has a serial number;
   each terminal comprises a look-up library of invalid serial numbers and means for comparing the serial number of each user's card with said library, thereby to verify that said card is is valid before the terminal is activated;
   said administrative database comprises a central library of invalid serial numbers; and
   said sending and storing means are adapted to transfer invalid card information from the central library to each look-up library.

16. A method for placing an audiovisual telephone call from a sending location to a receiving location at the request of a first user who possesses a debit card, the method comprising:
   a) at the sending location, reading an account balance from the card and, if there is a sufficient positive balance, enabling the call to be made;
   b) receiving from the first user a designation of the receiving location, and, responsive to said designation, retrieving a billing rate and a destination telephone number from a database at the sending location;
   c) automatically dialing the retrieved destination telephone number, thereby to establish connection between the sending and receiving locations at least partly over a software defined digital network;
   d) if the automatic dialing step results in a connection between the sending and receiving locations, bidirectionally transmitting digital audiovisual data between said locations for the duration of any resulting telephone call, said data constituting a video teleconference such that the first user is in uninterrupted mutual audiovisual contact with a second user at the, receiving location throughout said duration;
   e) at the sending location evaluating the time remaining for the call before said account balance will be exhausted at said billing rate;
   f) displaying, on a monitor screen, at least one message that announces time remaining for the call; and
   f) debiting the account recorded in said card in accordance with said billing rate and said duration.

17. The method of claim 16, further comprising, before enabling the call to be made:
   reading a serial number from the debit card; and
   comparing the serial number to a list of serial numbers in a database at the sending location, thereby to verify that the debit card is valid.

18. The method of claim 16, wherein the step of receiving a designation of the receiving location is carried out by:
   displaying a selection of geographical locations on a touch-sensitive graphical display device; and
   receiving a signal generated when the user touches a selected portion of the geographical display.

19. The method of claim 18, wherein the displaying step comprises displaying a sequence of fields, each field containing geographical information of greater detail than the preceding field, and each field after the first is displayed in response to a designation made by the user by touching a portion of the preceding field.

20. The method of claim 18, wherein the displaying step comprises representing geographical information in the form of at least one user-designatable icon.

21. The method of claim 18, wherein the displaying step comprises representing geographical information in the form of at least one map having at least one user-designatable portion.

* * * * *